INVENTOR:
BENJAMIN F. ALLEN,
BY
ATTORNEY

United States Patent Office

3,445,726
Patented May 20, 1969

3,445,726
PROTECTIVE SYSTEM FOR GAS-FILLED
ELECTRIC APPARATUS
Benjamin F. Allen, Rome, Ga., assignor to General
Electric Company, a corporation of New York
Filed Dec. 15, 1966, Ser. No. 601,993
Int. Cl. H02h 7/14
U.S. Cl. 317—14                                            8 Claims

ABSTRACT OF THE DISCLOSURE

A sealed enclosure for electric apparatus filled with insulating gas under pressure is provided with low density alarm or protective means operable throughout the normal operating ranges of pressure and temperature and in response to temperature and pressure signals obtainable externally of the enclosure.

---

My invention relates to protective equipment for electrical apparatus, and more particularly to a fluid-density responsive protective system for sealed electric translating apparatus of the gas-filled type, such as gas insulated transformers and the like.

It is known to immerse electric power translating apparatus, such as transformers and the like, in an insulating gas of high dielectric strength confined within a sealed enclosure or housing. It is desirable in a gas-filled apparatus of this type to have a readily accessible and easily replaceable means for monitoring the quantity of contained gas to determine whether or not any leakage has occurred from time to time. The quantity of gaseous dielectric in a sealed enclosure may be determined by measurement of gas density. However, where the enclosure includes also an electric translating apparatus such as a power transformer the apparatus, and thus the enclosed gas, varies in temperature and pressure over wide normal ranges between no load and full load of the electric apparatus. It is therefore not possible to determine density by measurement of pressure alone.

A known system for monitoring gas density, i.e., for detecting leaks, in a sealed gas-filled enclosure for electric apparatus is by means of pressure comparison between the gas in the main enclosure and a fixed quantity of the same gas in a small sealed control container mounted within the main enclosure. The control container must be mounted within the main container so that it will be exposed to the same conditions of temperature, so that its contained gas will exhibit the same pressure response as does the main body of gas. Such a system, of course, requires that the apparatus be taken out of service and opened up for the purpose of any maintenance or repair. This is undesirable because it is a very expensive and time-consuming operation.

Accordingly it is a principal object of my invention to provide a new and improved protective system responsive to gas leakage from a sealed enclosure for gas-insulated electric power translating apparatus.

It is another object of my invention to provide a gas density responsive leak detecting equipment for gas-filled electric apparatus which is operable at any desired number of points within normal ranges of temperature and pressure throughout the operating range of the electric apparatus.

It is still another object of my invention to provide density-monitorying equipment for gas-filled electric apparatus which is adapted to be applied externally to the apparatus for easy removal and maintenance.

In carrying out my invention in one preferred embodiment, I provide an electric power translating apparatus having a sealed housing which contains a predetermined quantity of gaseous dielectric. As current loading of the apparatus varies, the pressure and temperature of the insulating gas varies, each throughout a normal operating range. To monitor gas density, and thus detect loss of gas from the casing, despite normal variation in temperature and pressure, I provide at least one protective alarm or control circuit containing a pair of associated electric switches. In each such circuit one switch is responsive to average housing temperature and is set to operate between open and closed circuit positions at a predetermined temperature as temperature increases in a normal range of temperatures. The other associated switch in the same circuit is responsive to pressure of the gas in the housing and is calibrated to be oppositely actuated between open and closed circuit positions as pressure increases and at a pressure slightly below that which normally corresponds to the temperature setting of the associated thermal switch. The two switches are so connected in their common protective circuit that their normal differential in time of actuation acts to maintain a normal conducting condition of the circuit (i.e., energized or deenergized). Upon loss of a significant quantity of contained gas, the gas pressure at any temperature is lower than normal so that actuation of the pressure switch is delayed. This reverses its normal time differential of operation with respect to the corresponding thermal switch and results, at least momentarily, in placing the common protective circuit in an abnormal conducting condition. Such abnormal circuit condition may be utilized in any desired way to initiate an alarm or control operation. Preferably a plurality of such protective circuits are utilized, each including an associated pair of thermal and pressure switches set to operate with small time differential at spaced-apart temperature and pressure points throughout the normal operating range of the apparatus.

My invention will be more fully understood and its various objects and advantages further appreciated by referring now to the following detailed specification taken in conjunction with the accompanying drawing in which.

Figure 1:
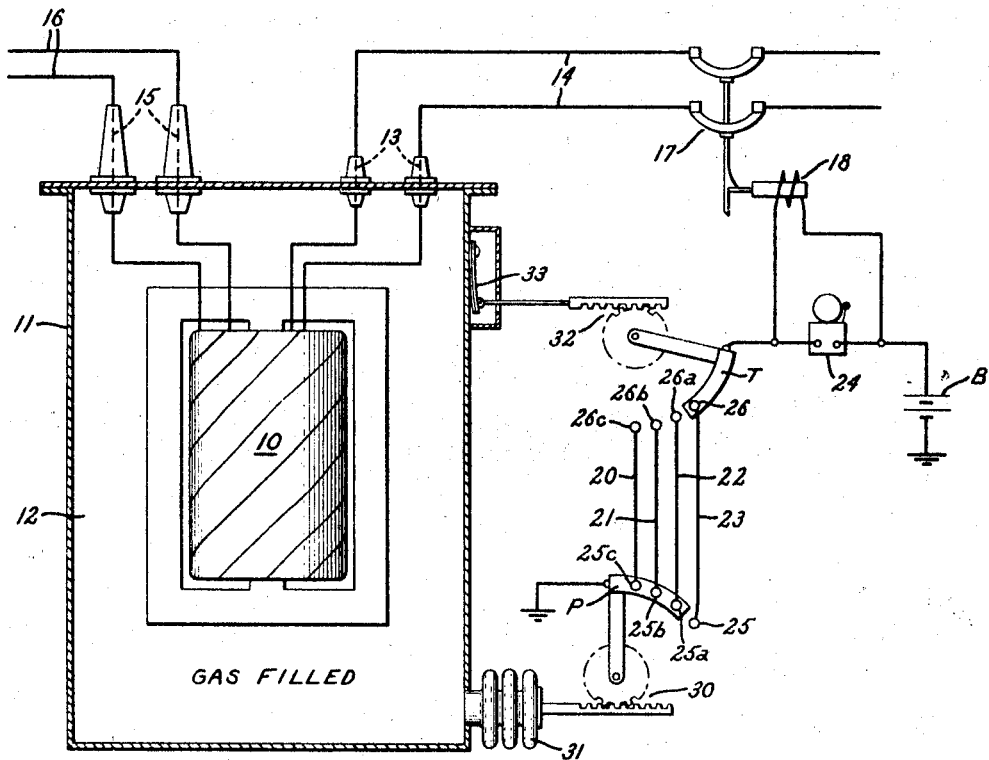
FIG. 1 is a cross-sectional view of a gas-filled electric transformer provided with a density-responsive protective circuit embodying my invention.
Figure 2:
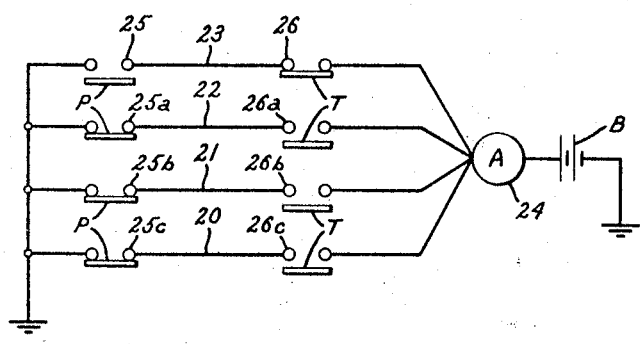
FIG. 2 is a simplified schematic circuit diagram of the protective circuit shown at FIG. 1.

Referring now to the drawing, and particularly to FIGS. 1 and 2, I have illustrated an electric power transformer comprising a core and coil assembly 10 mounted within a sealed housing or enclosure 11 within which is contained a predetermined normal quantity of insulating gas 12. As is well understood by those skilled in the art, the core and coil assembly 10 includes low voltage and high voltage windings in inductive relation. As shown, the low voltage winding is connected through bushing conductors 13 to a pair of low voltage line conductors 14, and the high voltage winding is connected through a pair of bushing conductors 15 to a pair of high voltage line conductors 16. The low voltage line 14 is provided with a suitable circuit breaker 17 shown latched in closed circuit position and adapted to be opened by actuation of a tripping solenoid including a trip coil 18.

For the purpose of detecting leakage in the enclosing housing 11 and consequent loss of a significant quantity of the contained insulating gas, I have illustrated a protective circuit including a plurality of mutually parallel branch circuits 20, 21, 22, 23. Each branch protective circuit includes an associated pair of temperature and pressure-responsive switches and each is connected in series between a source of electric current supply and an electro-responsive protective device. As shown at FIG. 1, the common series portion of the several branch protective circuits includes the trip coil 18 and an alarm device, such as a bell 24, in parallel circuit relation. Power is supplied to the protective circuit through a battery B or from any other suitable source of electric current supply. It will now be understood that in referring herein to a protective circuit or circuits, I mean to include a circuit performing either alarm or control operations or both.

The parallel branch portions 20, 21, 22 and 23 of the density-responsive protective circuit each include one of a set of pressure responsive switches 25, 25a, 25b, 25c and one of a set of temperature responsive switches 26, 26a, 26b, 26c. At FIG. 1 these two sets of switches are indicated schematically as a two series of fixed contacts, each engaging or disengaging sequentially with arcuate movable contact members P and T, respectively. The contact member P for the pressure switches is movable between extreme positions of engagement with and disengagement from all the contacts 25, 25a, 25b and 25c, and is actuated by suitable mechanism, shown as a rack and pinion 30, from a gas pressure responsive device illustrated as a bellows 31. Similarly, the arcuate contact member T for the thermal switches is movable between extreme positions of engagement with and disengagement from all the contacts 26, 26a, 26b, 26c and is actuated through a suitable mechanism 32 from a temperature-responsive device shown as a bi-metal 33. The pressure-responsive bellows 31 is movable in response to the pressure of gas within the sealed housing 11 and actuates the contact bar P to open the pressure switches 25, 25a, 25b and 25c sequentially as pressure increases over a normal range of pressures corresponding to a normal range of operating temperatures. In the no load low pressure condition, all the pressure switches 25, 25a, 25b and 25c are closed, but at FIGS. 1 and 2, the apparatus is shown in an intermediate condition where the switch 25 has been opened.

The temperature-responsive bi-metallic device 33 is preferably located upon a portion of the tank or housing wall where the temperature is representative of average temperature of the contained gas. The bi-metal is movable over a normal range of temperatures to actuate the conducting bar T and close the temperature switches 26, 26a, 26b, 26c sequentially as temperature increases from no load to full load condition. In the low temperature or no load condition, all these thermal switches are open, but at FIGS. 1 and 2, the apparatus is shown in an intermediate condition wherein the switch 26 is closed.

It will be observed that each of the parallel electric rircuits 20, 21, 22 and 23 includes an associated pair of the pressure and temperature-responsive switches, one pressure-responsive and one temperature-responsive switch being connected in series circuit relation in each circuit. This is clearly illustrated at both FIG. 1 and FIG. 2. Each temperature-responsive switch 26, 26a, 26b, 26c is calibrated to be actuated between open and closed circuit positions at a predetermined temperature within the normal range or operating temperatures. Specifically, these switches are arranged to close in sequential order at progressively higher temperatures beginning with the switch 26 and proceeding toward the switch 26c, and to open in reverse order as temperature decreases. Similarly the pressure-responsive switches 25, 25a, 25b, 25c are arranged to be opened in sequential order as pressure increases beginning with the switch 25 and ending with the switch 25c, these switches closing in reverse order as pressure falls. Each pressure switch is included in series circuit relation with one of the thermal switches and is set to operate at a pressure slightly less than the gas pressure normally corresponding to the setting of the associated thermal switch. For example, the thermal switch 26 may be set to close at 25 degrees C., and the associated series-connected pressure switch 25 set to open at a pressure slightly below that normally corresponding to a temperature of 25 degrees. This provides a small time differential in the operation of the series-connected pair of switches so that the normal open condition of the series circuit including the switches is not disturbed by their normal operation. For example, if the pressure corresponding to 25 degrees C. in temperature is normally 4 pounds per square inch, the pressure switch 20 may be set to operate slightly below this point, as at 3.75 pounds per square inch.

The remaining associated pairs of temperature and pressure-responsive switches in the parallel branch circuits 20, 21 and 22 are similarly set with a small normal time differential of operation at progressively higher temperatures throughout the normal operating range of temperature. It will be understood that this is accomplished by setting each pressure switch to operate at a pressure slightly below the pressure normally corresponding to the temperature at which its associated thermal switch is actuated. It will be understood by those skilled in the art that in so calibrating each associated pair of thermal and pressure switches, the differential between opening and closing operation of each switch itself must be taken into account, so that in normal operation there is a time differential between the opposite operation of each associated pair of switches, both upon increase and upon decrease of temperature in normal range.

Figure 3:
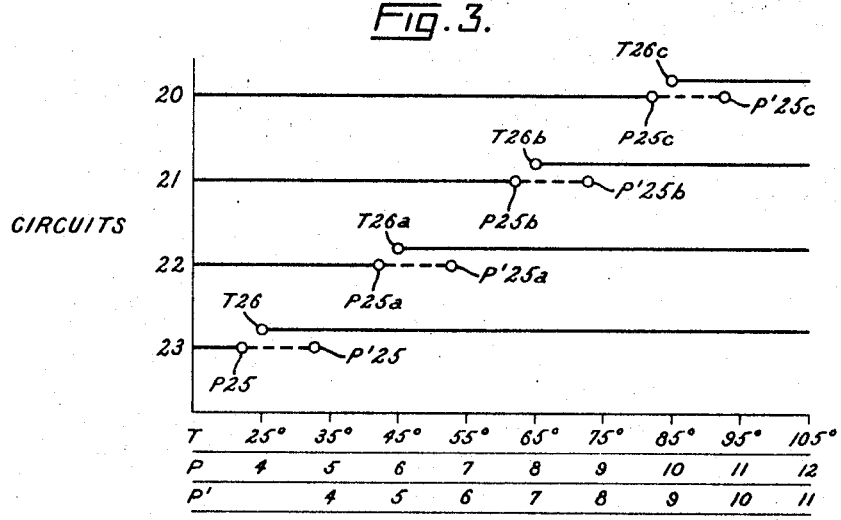
FIG. 3 is a graphical representation of normal and abnormal sequences of operation of the several thermal and pressure responsive switches shown in FIGS. 1 and 2.

The foregoing setting of the thermal and pressure-responsive switches of FIGS. 1 and 2 is graphically depicted at FIG. 3 wherein the conducting condition of each of the parallel branch circuits 20, 21, 22 and 23 is illustrated along a base scale T of temperature in degrees centigrade and a superposed base scale P of corresponding normal pressure in pounds per square inch. The numerical correspondence of these superposed scales is not intended to be exact in a quantitative sense, but has been selected arbitrarily for the purpose of qualitative illustration.

On these normal temperature and pressure scales T and P, respectively of FIG. 3, the operating point of each thermal and pressure switch is designated by the switch member and appropriate scale, as P25; T36, etc. Switch position is indicated by a solid line to that side of the operating point on which the switch is closed. Thus it will be evident, for example, that with temperature and pressure increasing normally, the pressure-responsive switch 25 in branch circuit 23 is opened slightly prior to the point at which the associated temperature-responsive switch 26 is closed (i.e., about 25 degrees C.). Thus the normal open-circuit or non-conductive condition of the circuit 23 is not disturbed so long as temperature and pressure within the transformer are increasing in normal correspondence. Similarly in the circuit 22, the pressure-responsive switch 25a is opened slightly prior to closing the associated temperature-responsive switch 26a so that at this higher temperature point (i.e., about 45 degrees C.) the normal open circuit condition of the circuit 22 is not disturbed. It will be evident that a like sequential operation with a normal small time differential takes place in the parallel circuits 21 and 20 at temperatures of about 65 degrees C. and 85 degrees C. respectively.

It may now be observed that if in the operation of the equipment shown at FIG. 1, a quantity of gas escapes from the enclosure 11, the gas pressure will be somewhat below normal at each temperature point throughout the normal range of operation. This is illustrated, for example, at the scale P' at FIG. 3 wherein a lower than normal pressure is shown corresponding to each temperature on the scale T. As a result of such abnormally low pressure, the normal time differential of each associated pair of thermal and pressure switches is reversed so that each such pressure switch is opened only at some time following closure of the associated thermal switch. This is illustrated at FIG. 3 by dotted lines extending the op-operating point of each pressure switch to a new P' position as P' 25, etc. By this reversal of the normal time differential between associated pairs of thermal and pressure switches, each of the parallel branch circuits 20, 21, 22 and 23 is sequentially placed, at least momentarily, in an abnormal conducting condition as temperature increases or decreases. For example, the circuit 23 is completed on increasing temperature when the switch 26 closes, because the switch 25 has not yet opened as it would have under normal pressure conditions. With the circuit 23 thus completed through its associated pair of switches, the alarm circuit is energized to actuate the trip coil 18 and the alarm bell 24. It is evident that the same circuit-completing action will take place through any of the other parallel circuits 20, 21 or 22 in the event that gas leakage and low pressure occurs at a higher temperature in the operating range of the apparatus. It will now be clear to those skilled in the art that any desired number of such branch protective circuits may be utilized, depending upon the number of temperature points throughout the operating range at which protection is desired.

Regarding the number of branch protective circuits utilized, it may be noted that in the illustrative apparatus of FIG. 1, no means is provided for sensing pressure loss at no load. This may be provided for by adding a protective branch circuit in which the temperature contact is left engaged at normal ambient temperature, and the pressure contact is engaged at a pressure (such as atmospheric) less than normal no load pressure.

Figure 4:
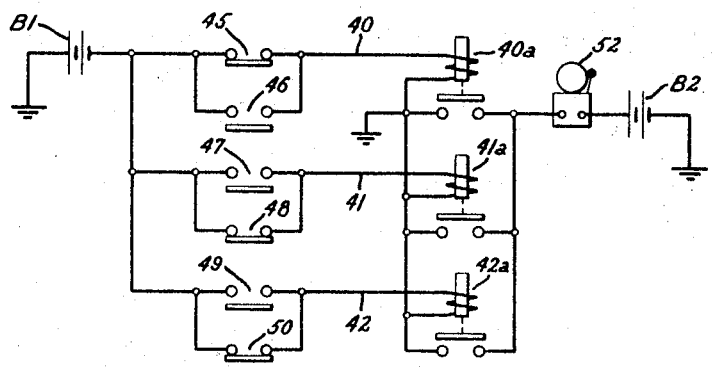
FIG. 4 is a schematic circuit diagram of a density-responsive protective circuit embodying my invention in another form.

At FIGS. 1, 2 and 3, the associated temperature and pressure-responsive switches in each of the sequentially operable protective circuits are shown in series circuit relation, with the operating differential of each pair of switches so arranged that the series circuit is normally maintained in a non-conductive or otherwise de-energized condition. It will be evident to those skilled in the art that, if desired, the several sequentially operable protective circuits may be arranged to be normally in a conductive or energized condition, or that the associated pair of switches in each such circuit may be arranged in parallel rather than series circuit relation. To illustrate one such modification, I have shown at FIG. 4 a plurality of sequentially operable branch protective circuits 40, 41, 42, each containing an associated pair of pressure and temperature-responsive switches connected in mutually parallel circuit relation. The parallel-connected switches of each pair normally maintain the respective branch circuits in conducting condition. For example, the circuit 40 includes a pressure-responsive switch 45 and a temperature-responsive switch 46 connected in parallel circuit relation, the circuit 41 includes a pressure-responsive switch 47 and a temperature-responsive switch 48 connected in parallel circuit relation, and the circuit 42 includes a pressure-responsive switch 49 and a temperature-responsive switch 50 in parallel circuit relation. It will be understood that the pressure switches 45, 47 and 49 are sequentially operable at progressively higher pressures, and the thermal switches 46, 48 and 50 are sequentially operable at progressively higher temperatures. This is illustrated graphically at FIG. 5 wherein the operation of the circuit of FIG. 4 is represented in the same manner as FIG. 3 is related to FIG. 1. From FIG. 5 it appears that the thermal switches 46, 48 and 50 open sequentially (i.e., at points T46, T48 and T50) as temperature increases, while the pressure switches 45, 47 and 48 close sequentially (P45, P47, P49) as pressure increases, each pressure switch closing before the paralleled thermal switch opens.

Each of the normally conducting protective circuits 40, 41 and 42 of FIG. 4 includes a relay 40a, 41a, 42a respectively, and is connected for energization to a common source of electric current supply such as a battery B1. Each of the normally energized relays 40a, 41a and 42a includes a pair of contacts closed upon deenergization of the relay, and all the relay contacts are connected in parallel circuit relation in an alarm circuit including a bell 52 and a battery B2.

Figure 5:
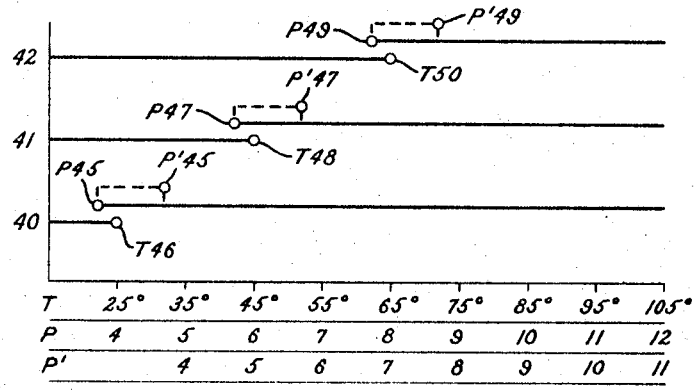
FIG. 5 is a graphical representation of normal and abnormal sequences of operation of the several thermal and pressure switches illustrated at FIG. 4.

In respect to the embodiment illustrated at FIGS. 4 and 5, it will now be evident from FIG. 5 that each pressure switch is calibrated to close its contacts at a pressure slightly below that normally corresponding to the temperature at which the associated thermal switch opens its contacts. Thus the time differential in each of the normally conducting circuits is so arranged that the parallel pairs of switches normally maintain their respective circuits closed as temperature increases throughout a normal range. Accordingly, none of the relays 40a, 41a and 42a are dropped out in normal operation, and the alarm 52 is not energized. If, however, some of the gas in the protected apparatus is lost so that the gas pressure at each temperature point throughout the operating range is lower than normal, the pressure switches in each of the circuits 40, 41 and 42 will not close until after the associated thermal switch has opened. This is illustrated at the scale P' at FIG. 5 and the corresponding abnormal operating points P' of the respective pressure switches. Thus at any protected point in the operating temperature range, low pressure will cause at least momentary interruption of one of the circuits 40, 41 or 42, so that the associated relay will drop out and energize the alarm device 52. It will be evident that, as in the embodiment described at FIGS. 1, 2 and 3, this abnormal action occurs by reversal of the normal time differential of operation between associated pairs of thermal and presure switches.

While I have shown and described only certain preferred embodiments of my invention, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A leak detecting system for gas-filled electric translating apparatus comprising:
  (a) a sealed housing enclosing said apparatus and containing a predetermined quantity of insulating gas, said gas varying in temperature and pressure over normal ranges between no load and full load conditions of said electric apparatus,
  (b) a plurality of temperature-responsive switches arranged to operate their contacts in one sense in sequential relation as the temperature of said electric apparatus increases within said normal range of temperature,
  (c) a plurality of gas pressure-responsive switches arranged to operate their contacts in the opposite sense in sequential relation as the pressures of said gas increases within said normal range of pressure,
  (d) a plurality of electric circuits each including one said temperature-responsive switch and one said pressure-responsive switch constituting a cooperating pair of switches,
  (e) each said pair of switches operating in opposite circuit controlling senses and being calibrated for actuation in differential time relation at a predetermined temperature and closely related pressure under normal temperature and pressure conditions, abnormally low gas pressure in relation to temperature in said electric apparatus reversing the normal time differential of each said pair of switches thereby at least momentarily to render abnormal the conducting condition of each said circuit, and
  (f) electroresponsive means actuable in response to an abnormal conducting condition of any one of said electric circuits.

2. A leak detecting system for gas-filled electric translating apparatus comprising:
   (a) a sealed housing enclosing said apparatus and containing a predetermined quantity of insulating gas, said gas varying in temperature and pressure over normal ranges between no load and full load conditions of said electric apparatus,
   (b) a temperature-responsive switch arranged to operate its contacts in a first circuit controlling sense at a predetermined temperature of said gas within said normal range of temperature,
   (c) a gas pressure-responsive switch arranged to operate its contacts in an opposite circuit controlling sense at a predetermined pressure differentially associated with the normal pressure at said predetermined temperature, said temperature-responsive and pressure-responsive switches operating in differential time relation in response to normal temperature and pressure variation in either direction,
   (d) an electric circuit including both said switches as a cooperating pair of switches connected normally to maintain said circuit in one predetermined conducting condition, abnormally low gas pressure in relation to temperature of said electric apparatus reversing the normal time differential of said pair of switches thereby at least momentarily to render abnormal the conducting condition of said electric circuit, and
   (e) electroresponsive means actuable in response to an abnormal conducting condition in said electric circuit.

3. A leak detecting system as claimed in claim 2 wherein said electric circuit includes said pressure-responsive and temperature-responsive switches in series circuit relation, said pressure-responsive switch opening its contacts and said temperature-responsive switch thereafter closing its contacts in differential time relation as the temperature of said electric apparatus increases.

4. A leak detecting system as claimed in claim 2 wherein said electric circuit includes said pressure-responsive switch and said temperature-responsive switch in mutually parallel circuit relation, said pressure-responsive switch closing and said temperature-responsive switch thereafter opening in differential time relation as the temperature of said electric apparatus increases.

5. A leak detecting system as claimed in claim 1 wherein each said electric circuit includes a cooperating pair of temperature-responsive and pressure-responsive switches in series circuit relation, the pressure-responsive switch of each pair opening and the cooperating temperature-responsive switch thereafter closing in differential time relation as the temperature of said electric apparatus increases.

6. A leak detecting system as claimed in claim 1 wherein each said electric circuit includes a cooperating pair of pressure-responsive and temperature-responsive switches connected in mutually parallel circuit relation, the pressure-responsive switch of each pair closing and the cooperating temperature-responsive switch thereafter opening in differential time relation as the temperature of said electric apparatus increases.

7. A leak detecting system as claimed in claim 5 wherein said electric circuits are connected in mutually parallel circuit relation independently to control a single said electroresponsive means.

8. A leak detecting system as claimed in claim 6 wherein said electric circuits are connected in mutually parallel circuit relation independently to control a single said electroresponsive means.

References Cited

UNITED STATES PATENTS

| | | | |
|---|---|---|---|
| 1,670,697 | 5/1928 | Treanor | 317—14 |
| 2,103,816 | 12/1937 | Hart | 200—81.5 |
| 2,176,338 | 10/1939 | Harrington | 200—81.5 |
| 2,553,291 | 5/1951 | Barr | 317—14 |
| 2,871,317 | 1/1959 | Sullivan | 200—81.5 |
| 3,129,309 | 4/1964 | McKeough | 200—81.5 |

JOHN F. COUCH, *Primary Examiner.*

DENNIS HARNISH, *Assistant Examiner.*

U.S. Cl. X.R.

200—81.5